United States Patent
Mourier et al.

(10) Patent No.: US 6,617,316 B1
(45) Date of Patent: Sep. 9, 2003

(54) OLIGOSACCHARIDES, THEIR PREPARATION AND PHARMACEUTICAL COMPOSITIONS CONTAINING THEM

(75) Inventors: Pierre Mourier, Charenton le Pont (FR); Elisabeth Perrin, Evrenus (FR); Jean-marie Stutzmann, Villecresnes (FR); Christian Viskov, Ris Orangis (FR); Florence Wahl, Paris (FR)

(73) Assignee: Aventis Pharma, Cedex (FR)

( * ) Notice: Subject to any disclaimer, the term of this patent is extended or adjusted under 35 U.S.C. 154(b) by 0 days.

(21) Appl. No.: 09/693,243

(22) Filed: Oct. 20, 2000

Related U.S. Application Data
(60) Provisional application No. 60/174,647, filed on Jan. 5, 2000.

(30) Foreign Application Priority Data

Oct. 22, 1999 (FR) .............................. 99 13182

(51) Int. Cl.$^7$ .................... A61K 31/727; A61K 31/715; C08B 37/10; C08B 37/00
(52) U.S. Cl. ............................ 514/56; 514/54; 536/21; 536/18.7
(58) Field of Search .................... 536/21, 18.7; 514/56, 514/54

(56) References Cited

U.S. PATENT DOCUMENTS 4,801,583 A    1/1989  Petitou et al. ................ 514/54
4,818,816 A    4/1989  Petitou et al. ............. 536/55.2
4,987,223 A    1/1991  Choay et al. ............... 536/17.7

OTHER PUBLICATIONS

Ichikawa et al., Synthesis, from cellobiose, of a risaccharide closely related to the GlcNAc–<GlcA–<GlcN segment of the anti–trombin–binding seqence of heparin., Carbohydrate Research, 141:273–282 (1985).

Wessel, Sulfated 1,6–anhydro–4–0–(beta–D–glucopyranosyluronate)–beta–D–glucopyranosyl derivatives: synthesis and conformations., J. Carbohydrate Chemistry, 11(8):1039–1052 (1992).

Primary Examiner—Kathleen K. Fonda
(74) Attorney, Agent, or Firm—Irving Newman

(57) ABSTRACT

The present invention relates to oligosaccharides of formula:

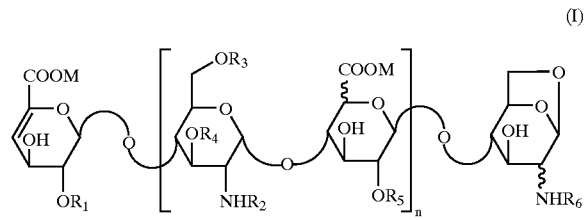

to mixtures thereof, to diastereoisomers thereof, to a process for preparing them, to pharmaceutical compositions containing them, and to their use in preventing or treating a disease associated with an inflammatory process involving the production of nitric oxide.

35 Claims, No Drawings

OLIGOSACCHARIDES, THEIR PREPARATION AND PHARMACEUTICAL COMPOSITIONS CONTAINING THEM

CROSS-REFERENCE TO RELATED APPLICATIONS

This application is a continuation of Provisional Application No. 60/174,647, filed Jan. 5, 2000 and claims priority from French Patent Application No. 99/13182, filed Oct. 22, 1999.

The present invention relates to oligosaccharides of formula:

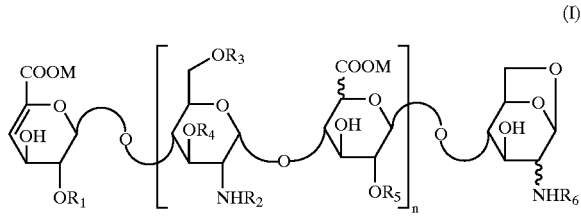

(I)

or mixtures thereof, to diastereoisomers thereof, to a process for their preparation and to pharmaceutical compositions containing them.

Disaccharide sulfates containing a 1,6-anhydro structure at the reducing end have been described by H. P. Wessel, J. Carbohydrate Chemistry, 11(8), 1039–1052 (1992); no pharmacological activity is mentioned for these products.

Trisaccharide sulfates comprising a 1,6-anhydro unit have also been described in patent EP 84999 and by Y. Ichikawa et al., Carbohyd. Res, 141, 273–282 (1985) as intermediates for preparing higher oligosaccharides. These trisaccharides have low anti-factor Xa activity.

In formula (I) n is 0 or an integer from 1 to 25; $R_1$, $R_3$, $R_4$ and $R_5$, which may be identical or different, represent a hydrogen atom or an $SO_3M$ radical; $R_2$ and $R_6$, which may be identical or different, represent a hydrogen atom or a radical selected from $SO_3M$ and $COCH_3$; and M is sodium, calcium, magnesium or potassium.

These oligosaccharides thus comprise an even number of saccharide units.

In formula (I), $R_4$ is preferably a hydrogen atom.

Preferably, n is 0 or an integer from 1 to 10; more preferably 0 or an integer from 1 to 6; even more preferably an integer from 1 to 6.

The oligosaccharides of formula (I) can be prepared by the action of an alkali metal or quaternary ammonium hydroxide on oligosaccharides of formula:

in which n is 0 or an integer from 1 to 25; $R_1$, $R_3$, $R_4$ and $R_5$, which may be identical or different, represent a hydrogen atom or an $SO_3M$ radical; $R_2$ and $R_6$, which may be identical or different, represent a hydrogen atom or a radical selected from $SO_3M$ and $COCH_3$ and M is sodium, calcium, magnesium or potassium, or a mixture thereof.

This reaction is carried out in aqueous medium, at a temperature of from 40 to 80° C., at a pH of from 10 to 13.

As alkali metal hydroxides which can be used, mention may be made of sodium hydroxide, potassium hydroxide, lithium hydroxide and cesium hydroxide.

As a quaternary ammonium hydroxide which may be used, mention may be made of tetrabutylammonium hydroxide.

The amount of alkali metal or quaternary ammonium hydroxide must be sufficient for the pH of the reaction medium to remain stable throughout the reaction. It is thus necessary to add the alkali metal or quaternary ammonium hydroxide continuously throughout the reaction.

Preferably, the alkali metal or quaternary ammonium hydroxide is in the form of an aqueous 1 to 5% solution.

Preferably, the reaction is carried out at a temperature of from 60 to 70° C.

Advantageously, the reaction pH is from 11 to 12.5.

The reaction is stopped by acidifying the reaction medium, for example by addition of acidic resin such as Amberlite IR120® resin (Fluka).

The oligosaccharides of formula (I) can be eventually purified by gel permeation chromatography with polyacrylamide-agarose type gel such as Ultrogel ACA202 (R) (Biosepra) as described hereinafter for the intermediate oligosaccharides of formula (II).

The oligosaccharides of formula (I) for which n is 0 or 1 can be also eventually purified on an alumina column with a water-ethanol mixture as eluant.

The intermediate oligosaccharides of formula (II) and mixtures thereof can be obtained by chromatographic separation on gel of a mixture of oligosaccharides (III) obtained by enzymatic depolymerization of heparin or basic depolymerization of the benzyl ester of heparin or of a benzyl ester of semi-synthetic heparin.

This chromatography is carried out on columns filled with gel of polyacrylamide-agarose type such as the gel sold under the brand name Ultrogel ACA202® (Biosepra). Preferably, an array of polyacrylamide agarose gel columns is used. The number of columns used is adapted as a function of the volume, of the gel and of the oligosaccharides to be separated. The mixture is eluted with a solution containing a phosphate buffer and sodium chloride. Preferably, the phosphate buffer is a solution containing 0.02 mol/l of $NaH_2PO_4/Na_2HPO_4$ (pH 7) containing 0.1 mol/l of sodium chloride. The detection of the various fractions is carried out by UV spectrometry (254 nm) and ionic spectrometry (IBF). The fractions thus obtained can then be optionally purified, for example by SAX (strong anion exchange) chromatography according to the methods known to those skilled in the art and in particular according to the methods described by K. G. Rice and R. J. Linhardt, Carbohydrate Research 190, 219–233 (1989), A. Larnkjaer, S. H. Hansen and P. B. Ostergaard, Carbohydrate Research, 266, 37–52 (1995) and in patent WO 90/01501 (Example 2). The fractions are then

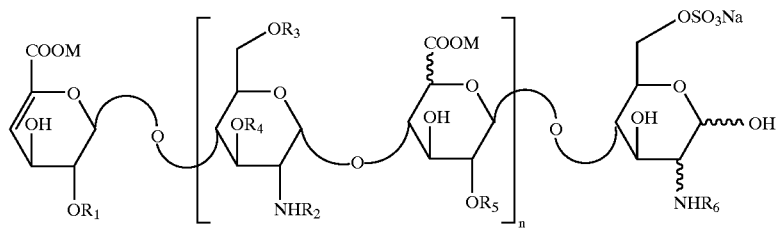

(II)

freeze-dried, after which they are desalified on a column filled with gel such as a column of Sephadex G10® gel (Pharmacia Biochemicals).

When the purification is not carried out by SAX chromatography, the lyophilizates can be optionally purified by simple or fractional precipitation according to the methods known to those skilled in the art and in particular according to the method described in patent FR 2 548 672. In general, the process is performed according to the following procedure:

The lyophilized fraction to be purified is dissolved at 25° C. in about ten volumes of distilled water. On adding methanol or ethanol, the desired oligosaccharide is precipitated, while monitoring its enrichment by HPLC chromatography (high performance liquid chromatography). The addition of methanol or ethanol is determined as a function of the desired yield and purity of the said oligosaccharide. Similarly, this operation can be carried out in several successive steps starting with the initial solution of lyophilizate. For this, more of the insolubilizing agent (methanol or ethanol) is added portionwise and the precipitate obtained after each addition is isolated. The precipitates thus prepared are analyzed by HPLC chromatography. Depending on the desired yield and purity, the suitable fractions of precipitate are combined.

For the intermediates of formula (II) for which n=0, 1 or 2, it is preferable to start with a mixture (III) obtained by enzymatic depolymerization of heparin.

This depolymerization is carried out by means of heparinase I (EC 4.2.2.7), in a pH 7 phosphate buffer solution, in the presence of sodium chloride and BSA (bovine serum albumin), at a temperature of between 10 and 18° C., and preferably 15° C., for 8 to 10 days, and preferably 9 days. The depolymerization is stopped, for example, by heating the reaction medium at 100° C. for 2 minutes, and the mixture is recovered by lyophilization. It is preferable to use 7 IU of heparinase I per 25 g of heparin. The phosphate buffer solution generally comprises 0.05 mol/l of $NaH_2PO_4$/$Na_2HPO_4$ (pH 7) in the presence of 0.1 mol/l of sodium chloride. The BSA concentration is generally 2%.

For the intermediates of formula (II) for which n=0, 1, 2, 3 or 4, it is preferable to start with a mixture (III) obtained by depolymerizing a benzyl ester of heparin.

The benzyl ester of heparin can be prepared according to the methods described in patents U.S. Pat. No. 5 389 618, EP 40 144 and FR 2 548 672. The degree of esterification will preferably be between 50 and 100%. More preferably, it will be between 70 and 90%.

The depolymerization is carried out in aqueous medium, by means of an alkali metal hydroxide (for example lithium hydroxide, sodium hydroxide, potassium hydroxide or cesium hydroxide) or of a quaternary ammonium hydroxide (for example tetrabutylammonium hydroxide), preferably at a molarity of between 0.1 and 0.2 mol/l, at a temperature of between 40 and 80° C., for 5 to 120 minutes. In one preferred mode, the process is performed for 5 to 15 minutes, at a temperature of between 60 and 70° C., with a 0.15 mol/l sodium hydroxide solution. The depolymerization reaction is stopped by neutralization by addition of an acid such as acetic acid. After addition of 10% by weight per volume of sodium acetate, the oligosaccharide mixture is precipitated by adding methanol, preferably 2 volumes per 1 volume of reaction medium, and filtered.

According to one preferred aspect of the invention, the oligosaccharide mixture obtained after chemical depolymerization, in the form of an aqueous solution, is enriched by ultrafiltration through membranes with a suitable nominal cutoff threshold (of the Pellicon type made with regenerated cellullose, sold by Millipore); the type of membrane being adapted as a function of the type of enriched oligosaccharides to be recovered. For the oligosaccharides (II) for which n=0, a membrane with a nominal cutoff threshold of 1 kDa will be used, for the oligosaccharides (II) for which n=1, a 1 kDa or 3 kDa membrane will be used, for the oligosaccharides (II) for which n=2, a 3 kDa membrane will be used, and for the oligosaccharides (II) for which n=3 or 4, a 5 kDa. membrane will be used. During this operation, the permeate is recovered and the retentate is discarded. Thus, the fraction of enriched product can represent from 50 to 10% of the initial oligosaccharide mixture while at the same time conserving at least 80% of the desired oligosaccharide.

For the intermediates of formula (II) for which n=0 to 25, it is preferable to start with a mixture (III) obtained by depolymerizing a benzyl ester or semi-synthetic polysaccharide sulfate. The benzyl ester of semi-synthetic polysaccharide sulfate is prepared from semi-synthetic polysaccharide sulfates' obtained from polysaccharide K5 and according to the. methods described in the patents WO 94/29352 and WO 96/14425. The esterification, depolymerization and recovery conditions are the same as those described above for the benzyl ester of heparin.

In all the preceding processes, the initial heparin can be of porcine, ovine, caprine or bovine origin and can be obtained from the mucus, lungs or hides of the animals. Preferably, a heparin from porcine or ovine mucus or from bovine lung is used, and even more preferably from porcine mucus.

The oligosaccharides of formula (I) have anti-inflammatory properties and can thus be used for preventing or treating diseases associated with an inflammatory process involving the production of cytotoxic substances such as nitrogen monoxide (NO) whose inducible form is released in particular by neutrophils or macrophages when the latter migrate and are activated in a tissue. The activation, migration, adhesion and infiltration of neutrophils takes place in ischemic tissue regions following an occlusion or spasm of an artery vascularizing this tissue. These ischemias can arise either in the brain (cerebrovascular accident) or in the myocardium (myocardial infarction) or in the lower limbs (so-called peripheral ischemias). The oligosaccharides of formula (I) can thus be used for the prevention and/or treatment of neurodegenerative diseases for which such inflammation plays a deleterious role which can lead to death, among which mention may be made of cerebral ischemias, cardiac ischemias (myocardial infarction), peripheral ischemias, traumas of the central nervous system, in particular, cranial, spinal and craniospinal traumas, multiple sclerosis, neuropathic pain and peripheral neuropathies, motor neuron diseases including amyotrophic lateral sclerosis, neuro-AIDS, Alzheimer's disease, Parkinson's disease and Huntington's chorea and certain forms of osteoarthritis, in particular of articular localization.

The anti-inflammatory activity of these products is demonstrated in vivo in the test of production of NOx (nitrite and nitrate) induced by a lipopolysaccharide (LPS) obtained from $E.\ coli$ according to the protocol described by M. Yamashita et al., Eur. J. Pharmacol, 338, 2, 151–158 (1997) or J. E. Shellito et al., Am. J. Respir. Cell Mol. Biol., 13, 1, 45–53 (1995).

0.5 mg/kg of the oligosaccharide are injected into male CD1 mice (Charles River, 25–35 g) at TO via intravenous bolus, and 1 or 2 mg/kg of the oligosaccharide are injected subcutaneously at T+15 minutes. At T+30 minutes, 100 mg/kg of lipopolysaccharide (LPS) obtained from $E.\ coli.$ (Sigma L3129, serotype 0127:B8) are injected. A further 1 or 2 mg/kg of the oligosaccharide are injected subcutaneously at T+3 hours. At T+5 hours 30 minutes, a blood sample is collected by ocular puncture and the concentrations of NOx (nitrite and nitrate) in the plasma are determined by the Griess colorimetric method after reduction of the nitrate to nitrite with nitrate reductase in the following way: 12 μl of the plasma sample are mixed with 88 μl of deionized water and incubated in the dark for 1 hour at room temperature with 40 µl of phosphate buffer (0.31 M, pH 7.5), 20 µl of β-NADPH (reduced nicotinamide adenine dinucleotide phosphate) (0.86 mM), 20 µl of FDA (flavin adenine dinucleotide) (0.11 mM) and 20 µl of nitrate reductase (2 U/ml) (Boehringer Mannheim). 10 µl of $ZnSO_4$ (1M) are added to precipitate the proteins and, after mixing, the samples are centrifuged at 20,000×g for 5 minutes. Finally, 50 µl of the supernatant are incubated for 10 minutes at room temperature with 100 µl of the Griess reagent (1% sulfanilamide in a phosphoric acid/0.1% naphthylethylenediamine mixture in deionized water (V/V)). The optical densities are read at 540 nm with a microplate spectrophotometer; each point being determined twice. $KNO_3$ and $NaNO_2$ are used as standards for the calorimetric method.

In this test, the oligosaccharides according to the invention inhibit the formation of NOx by more than 50%.

Among the oligosaccharides of formula (I) which are preferred, mention may be made in particular of the oligosaccharides for which:

$n$ is equal to 0, $R_1$ and $R_6$ represent an $SO_3Na$ radical and M is sodium, and the mixture of its diastereoisomers;

$n$ is equal to 1, $R_1$, $R_2$, $R_3$, $R_5$ and $R_6$ represent an $SO_3Na$ radical, $R_4$ represents a hydrogen atom and M is sodium, and the mixture of its diastereoisomers;

$n$ is equal to 2, $R_1$, $R_2$, $R_3$, $R_5$ and $R_6$ represent an $SO_3Na$ radical, $R_4$ represents a hydrogen atom and M is sodium, and the mixture of its diastereoisomers;

$n$ is equal to 2, $R_1$, $R_2$, $R_3$ and $R_6$ represent an $SO_3Na$ radical, $R_5$ represents a hydrogen atom or an $SO_3Na$ radical, $R_4$ represents a hydrogen atom and M is sodium, and the mixture of its diastereoisomers (1,6-anhydro ΔIs-Is-IIs derivative).

The examples which follow are representative of the preparation of the oligosaccharides of formula (I) and of the intermediates.

In these examples, the abbreviations have the following meanings:

ΔIs: (4-deoxy-2-O-sulfo-α-L-threo-hex-enopyranosyluronic acid)-(1→4)-2-deoxy-2-sulfoamino-6-O-sulfo-a-D-glucopyranose, tetrasodium salt, or ΔUAp2S-(1→4)-α-D-GlcNp2S6S Is: (2-sulfo-α-L-idopyranosyluronic acid)-(1→4)-2-deoxy-2-sulfoamino-6-O-sulfo-α-D-glucopyranose, tetrasodium salt, or α-L-IdoAp2S-(1→4)-α-D-GlcNp2S6S IIs: (α-L-idopyranosyluronic acid)-(1→4)-2-deoxy-2-sulfoamino-6-O-sulfo-α-D-glucopyranose, trisodium salt, or α-IdoAp-(1→4)-α-D-GlcNp2S6S IIIs: (2-sulfo-α-L-idopyranosyluronic acid)-(1→4)-2-deoxy-2-sulfoamino-α-D-glucopyranose, trisodium salt, or α-L-IdoAp2S-(1→4)-α-D-GlcNp2S IdoAp: idopyranosyluronic acid GlcNp: 2-deoxy-2-aminoglucopyranose αUap: 4-deoxy-α-L-threo-hex-enopyranosyluronic acid S: sulfate

EXAMPLES OF PREPARATION OF THE MIXTURES OF FORMULA (II)

EXAMPLE A

Preparation of the Oligosaccharides of Formula (II) for Which n=0, 1 and 2 by Enzymatic Depolymerization and Separation 25 g of heparin are dissolved in 250 ml of a phosphate buffer solution containing 0.05 mol/l of $NaH_2PO_4/Na_2HPO_4$ (pH=7), 0.2 mol/l of sodium chloride and 2% of BSA (bovine serum albumin). 7 IU of heparinase I (EC 4.2.2.2.7) are introduced into the mixture and the solution obtained is cooled to 15° C. and then kept at this temperature throughout the depolymerization reaction. The reaction progress is monitored by taking aliquot samples at intervals, which are analyzed by gel permeation chromatography. After 9 days, the enzymatic reaction is stopped by heating the reaction medium at 100° C. for 2 minutes. The cooled mixture is then lyophilized. An oligosaccharide mixture (III) is thus obtained.

The oligosaccharide mixture (III) obtained is then chromatographed according to the following method: the chromatography is carried out on columns filled with polyacrylamide-agarose gel known under the name Ultrogel ACA 202 and the mixture is eluted with a solution containing a phosphate buffer (0.02 ml/l $NaH_2PO_4/Na_2HPO_4$) pH=7 and 0.1 mol/l of sodium chloride. The detection is performed by UV spectrometry (254 nm) and ionic spectrometry (IBF). The products can be optionally purified by SAX (strong anion exchange) chromatography or by fractional precipitation according to the method described in patent FR 2 548 672. The fractions of product recovered are lyophilized and then desalified on a column filled with Sephadex G10® gel (Pharmacia Biochemicals).

By this method, 3 g of disaccharide Is and 1100 mg of a hexasaccharide mixture typically containing 55% of ΔIs-Is-Is derivative, 35% of ΔIs-Is-IIs and 10% of ΔIs-Is-IIIs derivative are obtained. The latter mixture can be purified according to the methods known to those skilled in the art in order to separate each of the constituents therefrom, or can be used in its current state for conversion into the 1,6-anhydro derivatives of formula (I). It should be noted that, during this conversion, the hexasaccharide ΔIs-Is-IIIs cannot lead to the formation of compounds of formula (I).

EXAMPLE B

Preparation of the Oligosaccharides of Formula (II) for Which n=0, 1, 2, 3 or 4 by Depolymerization of the Benzyl Ester of Heparin and Separation a—Preparation of the Benzyl Ester of Heparin The benzyl ester of heparin is prepared according to Example 3 of U.S. Pat. No. 5,389,618.

b—Depolymerization 100 g of benzyl ester of heparin are dissolved in 1.9 l of demineralized water. The mixture is brought to 60° C. with stirring. After obtaining the homogeneous solution, about 35 ml of a 23% sodium hydroxide solution are introduced in a single portion. After reaction for 10 minutes, the solution is then cooled and neutralized with 80 ml of an approximately 2 N acetic acid solution. 10% by weight/volume of sodium acetate is added to this solution. The oligosaccharide mixture is precipitated by adding about 2 volumes of methanol. The precipitate is isolated by filtration, washed twice with methanol and then dried under reduced pressure at 50° C. After drying, 73.8 g of an oligosaccharide mixture (II) is obtained. c-Enrichment with oligosaccharide for which n=1

30 g of the oligosaccharide mixture obtained above are dissolved in about 35 volumes of water. This solution is ultrafiltered through a 3 kDa membrane (Pellicon). When 600 ml of permeate have been drawn, the retentate is diluted with 500 ml of water. The operation is continued until an additional 450 ml of permeate have been drawn. The two fractions of permeate are combined and then concentrated to dryness under reduced pressure. 6.1 g of a yellowish-white solid are obtained. Analysis of the solid by gel permeation chromatography indicates that it contains about 30% of oligosaccharide of formula (II) for which n=1.

d—Fractionation of the Ultrafiltered Oligosaccharide Mixtures

The enriched mixture is fractionated on columns filled with polyacrylamide-agarose gel known under the name Ultrogel ACA 202 (4 columns in series of diameter 10 cm and length 50 cm are used). 5 g of the mixture enriched by ultrafiltration are dissolved in 25 ml of water and then eluted with a 0.2 mol/l sodium chloride solution at a rate of 5 ml/min. 25-ml fractions are collected at the bottom of the column. The products are detected by UV spectrometry (254 nm) and ionic spectrometry (IBF). The fractions of product for which n=1 are recovered, lyophilized and then desalified on a column filled with Sephadex G10 gel. After lyophilization, 1 g of tetrasaccharide typically containing 70% of ΔIs-Is derivative of formula II ($R_1$, $R_2$, $R_3$, $R_5$ and $R_6$=$SO_3Na$; $R_4$=H and M=Na) is obtained. The ΔIs-Is derivative can be optionally purified by SAX (strong anion exchange) chromatography or, according to a preferred aspect, by fractional precipitation according to the method described in patent FR 2 548 672.

EXAMPLE 1

5 ml of a 0.0063 mol/l sodium hydroxide solution are introduced into a reactor maintained at 66° C. The pH of the solution is then measured and taken as the target value (pH=11.35). 30 mg of the oligosaccharide of formula (II) for which n is equal to 0, $R_1$ and $R_6$ represent an $SO_3Na$ radical and M is sodium are added in a single portion, with stirring. The pH is then adjusted and maintained at pH 11.35 by continuous addition of a 0.5 mol/l sodium hydroxide solution. After 10 hours, the addition of sodium hydroxide is stopped and the reaction mixture is cooled to 25° C. The pH of the solution is then brought to between 6 and 7 by addition of Amberlite IR120 resin. The mixture is filtered through a Whatman GF/B membrane and then concentrated to dryness under reduced pressure (2.7 kPa) at a temperature in the region of 25° C. The product is taken up in 0.5 ml of distilled water and then lyophilized. 29 mg of a mixture of diastereoisomers of the oligosaccharide of formula (I) for which n is equal to 0, $R_1$ and $R_6$ represent an $SO_3Na$ radical and M is sodium are thus obtained [(4-deoxy-2-O-sulfo-α-L-threo-hex-4-enopyranosyluronic acid (1→4)-1,6-anhydro-2-deoxy-2-sulfoamino-p-D-mannopyranose, trisodium salt): proton spectrum in $D_2O$, 400 MHz, T=298 K, δ in ppm: 3.15 (1H, s, H2), 3.75 (2H, m, H6 and H3), 3.88 (1H, m, H4), 4.20 (1H, d, J=8 Hz, H6), 4.22 (1H, t, J=5 Hz, H3'), 4.58 (1H, m, H2'), 4.75 (1H, m, H5), 5.53 (1H, s, H1), 5.60 (1H, dd, J=6 and 1 Hz, H1'), 6.03 (1H, d, J=5 Hz, H4'); (4-deoxy-2-O-sulfo-α-L-threo-hex-4-enopyranosyluronic acid-(1→4)-1,6-anhydro-2-deoxy-2-sulfoamino-β-D-glucopyranose, trisodium salt): proton spectrum in $D_2O$, 400 MHz, T=298 K, δ in ppm: 3.34 (1H, dd, J=7 and 2 Hz, H2), 3.72 (1H, t, J=8 Hz, H6), 3.90 (1H, m, H3), 4.03 (1H, s, H4), 4.20 (1H, d, J=8 Hz, H6), 4.23 (1H, t, J=5 Hz, H3'), 4.58 (1H, m, H2'), 4.78 (1H, m, H5), 5.50 (1H, s, H1), 5.60 (1H, dd, J=6 and 1 Hz, H1'), 5 6.03 (1H, d, J=5 Hz, H4')].

EXAMPLE 2

33.3 ml of a 0.0063 mol/l sodium hydroxide solution are introduced into a reactor maintained at 62° C. The pH of the solution is then measured and taken as the target value (pH=11.15). 200 mg of the oligosaccharide of formula (II) for which n is equal to 1, $R_1$, $R_2$, $R_3$, $R_5$ and $R_6$ represent an $SO_3Na$ radical, $R_4$ represents a hydrogen atom and M is sodium are added in a single portion, with stirring. The pH is then adjusted and maintained at pH 11.15 by continuous addition of a 0.5 mol/l sodium hydroxide solution. After 12 hours, the addition of sodium hydroxide is stopped and the reaction mixture is cooled to 25° C. The pH of the solution is then brought to between 6 and 7 by addition of Amberlite IR120 resin. The mixture is filtered through a Whatman GF/B membrane and then concentrated to dryness under reduced pressure (2.7 kPa) at a temperature in the region of 25° C. The product is taken up in 3 ml of distilled water and then lyophilized. 230 mg of the oligosaccharide of formula (I) for which n is equal to 1, $R_1$, $R_2$, $R_3$, $R_5$ and $R_6$ represent an $SO_3Na$ radical, $R_4$ represents a hydrogen atom and M is sodium are thus obtained in the form of a mixture of diastereoisomers [(4-deoxy-2-O-sulfo-α-L-threo-hex-4-enopyranosyluronic acid-(1→4)-2-deoxy-2-sulfoamino-6-O-sulfo-α-D-glucopyranosyl-(1→4) 2-O-sulfo-α-L-idopyranosyluronic acid-(1→4)-1,6-anhydro-2-deoxy-2-sulfoamino-β-D-mannopyranose, heptasodium salt): proton spectrum in $D_2O$, 400 MHz, T=298 K, δ in ppm: 3.15 (1H, s, H2), 3.25 (1H, m, H2"), 3.60 (1H, m, H3"), between 3.70 and 4.70 (14H, broad peak, H3/H4/H6, H2'/H3'/H4'/H5', H4"/H5"/H6", H2"'/H3"'), 4.75 (1H, m, H5), between 5.20 and 5.40 (2H, m, H1' and H1"), 5.45 (1H, m, H1"'), 5.56 (1H, m, H1), 5.94 (1H, d, J=5 Hz, H4); (4-deoxy-2-O-sulfo-α-L-threo-hex-4-enopyranosyluronic acid, -(1→4)-2-deoxy-2-sulfoamino-6-O-sulfo-α-D-glucopyranosyl-(1→4)-2-O-sulfo-α-L-idopyranosyluronic acid-(1→4)-1,6-anhydro-2-deoxy-2-sulfoamino-p-D-glucopyranose, heptasodium salt): proton spectrum in $D_2O$, 400 MHz, T=298 K, δ in ppm: 3.25 (1H, m, H2"), 3.42 (1H, dd, J=4 and 1 Hz, H2), 3.60 (1H, m, H3"), between 3.70 and 4.70 (14H, broad peak, H3/H4/H6, H2'/H3'/H4'/H5', H4"/H5"/H6", H2"'/H3"'), 4.75 (1H, m, H5), between 5.20 and 5.40 (2H, m, H1' and H1"), 5.45 (1H, m, H1"'), 5.52 (1H, m, H1), 5.94 (1H, d, J=5 Hz, H4)].

EXAMPLE 3

16.7 ml of a 0.0063 mol/l sodium hydroxide solution are introduced into a reactor maintained at 62° C. The pH of the solution is then measured and taken as the target value (pH=11.7). 100 mg of the oligosaccharide of formula (II) for which n is equal to 2, $R_1$, $R_2$, $R_3$, $R_5$ and $R_6$ represent an $SO_3Na$ radical, $R_4$ represents a hydrogen atom and M is sodium are added in a single portion, with stirring. The pH is then adjusted and maintained at pH 11.7 by continuous addition of a 0.5 mol/l sodium hydroxide solution. After 10 hours, the addition of sodium hydroxide is stopped and the reaction mixture is cooled to 25° C. The pH of the solution is then brought to between 6 and 7 by addition of Amberlite IR120 resin. The mixture is filtered through a Whatman GF/B membrane and then concentrated to dryness under reduced pressure (2.7 kPa) at a temperature in the region of 25° C. The product is taken up in 3 ml of distilled water and then lyophilized. 108 mg of the oligosaccharide of formula (I) for which n is equal to 2, $R_1$, $R_2$, $R_3$, $R_5$ and $R_6$ represent an $SO_3Na$ radical, $R_4$ represents a hydrogen atom and M is sodium are thus obtained in the form of a mixture of diastereoisomers. The sugars constituting the hexasaccharides are noted from A to F, A being the 1,6-anhydro residue and F being the unsaturated uronic acid residue. [(4-deoxy-2-O-sulfo-α-L-threo-hex-4-enopyranosyluronic acid-(1→4)-2-deoxy-2-sulfoamino-6-O-sulfo-α-D-glucopyranosyl-(1→4)-2-O-sulfo-α-L-idopyranosyluronic acid-(1→4)-2-deoxy-2-sulfoamino-6-O-sulfo-α-D-glucopyranosyl-(1→4)-2-O-sulfo-α-L-idopyranosyluronic acid-(1→4)-1,6-anhydro-2-deoxy-2-sulfoamino-β-D-mannopyranose, undecasodium salt: proton spectrum in $D_2O$, 600 MHz, T=298 K, δ in ppm: 3.15 (1H, s, H2(A)), 3.25 (2H, m, H2(C+E)), 3.60 (2H, m, H3(C+E)), between 3.65 and 4.50 (19H, broad peak, H2(B+D)/H3(A+B+D+F)/H4(A+B+C+D+E)/H5(C+E)/H6(A+C+E)), 4.60 (1H, s,. H2(F)), 4.80 (3H, m, H5(A+B+D), 5.18 (1H, s, H1(D)), 5.30 (1H, s, H1(B)), 5.34 (1H, d, H1(C)), 5.36 (1H, d, H1 (E).), 5.46 (1H, s, H1 (F)), 5.57 (1H, s, H1(A)), 5.95 (1H, d, J=5 Hz, H4(F)); (4-deoxy-2-O-sulfo-α-L-threo-hex-4- enopyranosyluronic acid-(1→4)-2-deoxy-2-sulfoamino-6-O-sulfo-α-D-glucopyranosyl-(1→4)-2-O-sulfo-α-L-idopyranosyluronic acid-(1→4)-2-deoxy-2-sulfamino-6-O-sulfo-α-D-glucopyranosyl-(1→4)-2-O-sulfo-α-L-idopyranosyluronic acid-(1→4)-1,6-anhydro-2-deoxy-2-sulfoamino-β-D-glucopyranose, undecasodium salt): proton spectrum in $D_2O$, 600 MHz, T=298 K, δ in ppm: 3.25 (2H, m, H2(C+E)), 3.42 (1H, m, H2(A)), 3.60 (2H, m, H3(C+E), between 3.65 and 4.50 (19H, broad peak, H2(B+D)/H3(A+B+D+F)/H4(A+B+C+D+E)/H5(C+E)/H6(A+C+E)), 4.60 (1H, s, H2(F)), 4.80 (3H, m, H5(A+B+D), 5.18 (1H, s, H1(D)), 5.31 (1H, s, H1(B)), 5.34 (1H, d, H1(C)), 5.36 (1H, d, H1(E)), 5.46 (1H, s, H1(F)), 5.52 (1H, s, H1(A)), 5.95 (1H, d, J=5 Hz, H4(F))].

EXAMPLE 4

4 ml of a 0.0316 mol/l sodium hydroxide solution are introduced into a reactor maintained at 62° C. The pH of the solution is then measured and taken as the target value (pH=11.8). 100.8 mg of an oligosaccharide mixture of formula (II) for which n is equal to 2, comprising 55% of ΔIs-Is-Is derivative ($R_1$, $R_2$, $R_3$, $R_5$ and $R_6$ represent an $SO_3Na$ radical, $R_4$ represents a hydrogen atom and M is sodium), 35% of ΔIs-Is-IIs ($R_1$, $R_2$, $R_3$ and $R_6$ represent an $SO_3Na$ radical, $R_5$ represents either an $SO_3Na$ radical or a hydrogen atom, $R_4$ represents a hydrogen atom and M is sodium) and 10% of ΔIs-Is-IIIs ($R_1$, $R_2$, $R_3$, $R_5$ and $R_6$ represent an $SO_3Na$ radical, $R_4$ represents a hydrogen atom and M is sodium, the function $SO_3M$ of carbon C6 being replaced with a hydrogen) are added in a single portion with stirring. The pH is then adjusted to and maintained at pH 11.8 by continuous addition of a 0.5 mol/l sodium hydroxide solution. After 11 hours, the addition of sodium hydroxide is stopped and the reaction mixture is cooled to 25° C. The pH of the solution is then brought to between 6 and 7 by addition of Amberlite IR120 resin. The mixture is filtered through a Whatman GF/B membrane and then concentrated to dryness under reduced pressure (2.7 kPa) at a temperature in the region of 25° C. The product is taken up in 1.5 ml of distilled water and then lyophilized. 110 mg of an oligosaccharide mixture of formula (I) for which n is equal to 2, in particular containing the 1,6-anhydro αIs-Is-Is derivative ($R_1$, $R_2$, $R_3$, $R_5$ and $R_6$ represent an $SO_3Na$ radical, $R_4$ represents a hydrogen atom and M is sodium) and the 1,6-anhydro αIs-Is-IIs derivative ($R_1$, $R_2$, $R_3$ and $R_6$ represent an $SO_3Na$ radical, $R_5$ represents either an $SO_3Na$ radical or a hydrogen atom, $R_4$ represents a hydrogen atom and M is sodium) are thus obtained. HPLC (high performance liquid chromatography) analysis in ion-pair mode makes it possible to monitor the conversion into derivatives of formula (I). In this case, the HPLC assay shows that the conversion is achieved for the ΔIs-Is-Is and ΔIs-Is-IIs derivatives.

EXAMPLE 5

8.6 ml of a 0.025 mol/l lithium hydroxide solution are introduced into a reactor maintained at 66° C. The pH of the solution is then measured and taken as the target value (pH=11.68). 50 mg of an oligosaccharide of formula (II) for which n is equal to 0, R1 and R6 represent an $SO_3Na$ radical and M is sodium are added in a single portion with stirring. The pH is then adjusted to and maintained at 11.68 by continuous addition of a 0.466 mol/l lithium hydroxide solution. After 8 hours, the addition of lithium hydroxide is stopped and the reaction mixture is cooled to 25° C. HPLC analysis in ion-pair mode makes it possible to monitor the conversion into a derivative of formula (I) for which n is 0, R1 and R6 represent $SO_3Na$ and M is Na or Li. The transformation by HPLC titration is 100% and the yield by internal calibration is 81.2%.

EXAMPLE 6

8.3 ml of a 0.0063 mol/l potassium hydroxide solution are introduced into a reactor maintained at 66° C. The pH of the solution is then measured and taken as the target value (pH=11.1). 50 mg of an oligosaccharide of formula (II) for which n is equal to 0, R1 and R6 represent an $SO_3Na$ and M is sodium are added in a single portion with stirring. The pH is then adjusted to and maintained at 11.1 by continuous addition of a 0.515 mol/l potassium hydroxide solution. After 24 hours, the addition of potassium hydroxide is stopped and the reaction mixture is cooled to 25° C. HPLC analysis in ion-pair mode makes it possible to monitor the conversion into a derivative of formula (I) for which n is 0, R1 and R6 represent $SO_3Na$ and M is Na or K. The transformation by HPLC titration is 100% and the yield by internal calibration is 75.6%.

EXAMPLE 7

8.3 ml of a 0.0063 mol/l cesium hydroxide solution are introduced into a reactor maintained at 66° C. The pH of the solution is then measured and taken as the target value (pH=10.75). 50 mg of an oligosaccharide of formula (II) for which n is equal to 0, R1 and R6 represent an $SO_3Na$ radical and M is sodium are added in a single portion with stirring. The pH is then adjusted to and maintained at 10. 75 by continuous addition of a 0.476 mol/l cesium hydroxide solution. After 20 hours, the addition of cesium hydroxide is stopped and the reaction mixture is cooled to 25° C. HPLC analysis in ion-pair mode makes it possible to monitor the conversion into a derivative of formula (I) for which n is 0, R1 and R6 represent $SO_3Na$ and M is Na or cesium. The transformation by HPLC titration is 90.3% and the yield by internal calibration is 73%.

EXAMPLE 8

8.3 ml of a 0.0063 mol/l tetrabutylammonium hydroxide solution are introduced into a reactor maintained by 66° C. The pH of the solution is then measured and taken as the target value (pH=10.95). 50 mg of an oligosaccharide of formula (II) for which n is equal to 0, R1 and R6 represent an $SO_3Na$ radical and M is sodium are added in a single portion with stirring. The pH is then adjusted to and maintained at 10.95 by continuous addition of a 0.521 mol/l tetrabutylammonium hydroxide solution. After 16 hours, the addition of tetrabutylammonium hydroxide is stopped and the reaction mixture is cooled to 25° C. HPLC analysis in ion-pair mode makes it possible to monitor the conversion into a derivative of formula (I) for which n is 0, R1 and R6 represent $SO_3Na$ and M is Na or tetrabutylammonium. The transformation by HPLC titration is 96.7% and the yield by internal calibration is 65%.

The medicinal products according to the invention comprise, as the active ingredient, at least one oligosaccharide of formula (I) or a mixture of oligosaccharides of formula (I), in the form of a composition in which it is combined with any other pharmaceutically compatible product, which can be inert or physiologically active. The medicinal products according to the invention can be used via the intravenous, subcutaneous, oral, rectal, topical or pulmonary (inhalation) route.

The sterile compositions for intravenous or subcutaneous administration are generally aqueous solutions. These compositions can also contain adjuvants, in particular wetting agents, tonicity agents, emulsifiers, dispersants and stabilizers. The sterilization can be carried out in several ways, for example by aseptic filtration, by incorporating sterilizing agents into the composition or by irradiation. They can also be prepared in the form of sterile solid compositions which can be dissolved, at the time of use, in sterile water or any other injectable sterile medium.

Solid compositions for oral administration which can be used are tablets, pills, powders (gelatin capsules or cachets)

or granules. In these compositions, the active ingredient is mixed with one or more inert diluents, such as starch, cellulose, sucrose, lactose or silica, under a stream of argon. These compositions can also comprise substances other than diluents, for example one or more lubricants such as magnesium stearate or talc, an agent for promoting oral absorption, a dye, a coating (dragees) or a varnish.

Liquid compositions for oral administration which can be used are pharmaceutically acceptable solutions, suspensions, emulsions, syrups and elixirs containing inert diluents such as water, ethanol, glycerol, plant oils or liquid paraffin. These compositions can comprise substances other than diluents, for example wetting products, sweeteners, thickeners, flavourings or stabilizers.

The compositions for rectal administration are suppositories or rectal capsules which contain, besides the active product, excipients such as cocoa butter, semi-synthetic glycerides or polyethylene glycols.

The compositions for topical administration can be, for example, creams, lotions, eye drops, throat sprays, nasal drops or aerosols.

The doses depend upon the desired effect, the duration of the treatment and the route of administration used; they are generally between 0.5 mg and 10 mg per kg per day subcutaneously, i.e. 3 to 60 mg per day for a 60 kg adult.

In general, the doctor will determine the appropriate dosage as a function of the age and weight and all the other personal factors of the individual to be treated.

The invention also relates to a method for preventing or treating diseases associated with an inflammatory process involving the production of cytotoxic substances such as nitric oxide (NO). The oligosaccharides of formula (I) can thus be used for preventing and/or treating neurodegenerative diseases for which cerebral inflammation plays a deleterious role which can lead to death, among which mention may be made of ischemias of the central nervous system, cerebral ischemias, retinal ischemias, cochlear ischemias, cardiac ischemias (myocardial infarction), peripheral ischemias, traumas of the central nervous system and in particular cranial, spinal and craniospinal traumas, retinal ischemias, cochlear traumas, multiple sclerosis, neuropathic pains and peripheral neuropathies, motor neuron diseases including amyotrophic lateral sclerosis, neuro-AIDS, Alzheimer's disease, Parkinson's disease and Huntington's chorea and certain forms of osteoarthritis, in particular of articular localization.

What is claimed is:

1. A purified oligosaccharide of formula:

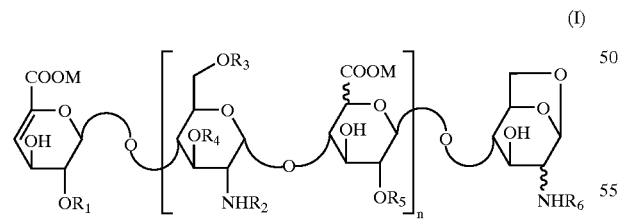

(I)

in which n is 0 or is an integer from 1 to 25, $R_1$, $R_3$, $R_4$ and $R_5$, which may be identical or different, represent a hydrogen atom or an $SO_3M$ radical; $R_2$ and $R_6$, which may be identical or different, represent a hydrogen atom or a radical selected from $SO_3M$ and $COCH_3$ and M is sodium, calcium, magnesium or potassium.

2. A purified oligosaccharide of formula (I) according to claim 1, for which $R_4$ represents a hydrogen atom.

3. A purified oligosaccharide of formula (I) according to claim 1 for which n is 0 or an integer from 1 to 10.

4. A purified oligosaccharide of formula (I) according to claim 3 for which n is 0 or an integer from 1 to 6.

5. A purified oligosaccharide of formula (I) according to claim 1 for which n is an integer from 1 to 6.

6. A pharmaceutical composition containing, as an active ingredient, at least one purified oligosaccharide according to claim 1.

7. A method for treating a disease associated with an inflammatory process involving the production of nitric oxide (NO) comprising administering to a patient in need of such treatment a purified oligosaccharide of formula (I) according to claim 1 together with a pharmaceutically acceptable carrier.

8. A method according to claim 7 wherein said disease is selected from the group consisting of cerebral, cardiac and peripheral vascular ischemias, osteoarthritis, traumas of the central nervous system, cranial, spinal and craniospinal traumas, multiple sclerosis, neuropathic pains and peripheral neuropathies, motor neuron diseases, amyotrophic lateral sclerosis, neuro-AIDS, Alzheimer's disease, Parkinson's disease and Huntington's chorea.

9. A purified oligosaccharide of formula (I) according to claim 1 for which n is 0.

10. A purified oligosaccharide of formula (I) according to claim 1 for which n is 1.

11. A purified oligosaccharide of formula (I) according to claim 1 for which n is 2.

12. A pharmaceutical composition containing, as an active ingredient, at least one purified oligosaccharide according to claims 2.

13. A process for preparing an oligosaccharide of formula:

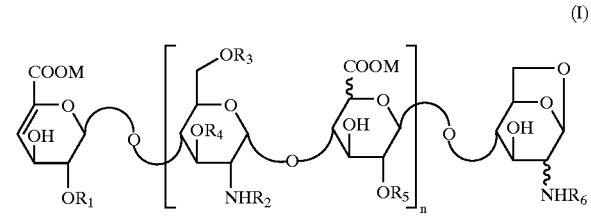

(I)

or mixtures thereof, in which n is 0 or is an integer from 1 to 25, $R_1$, $R_3$, $R_4$ and $R_5$, which may be identical or different, represent a hydrogen atom or an $SO_3M$ radical; $R_2$ and $R_6$, which may be identical or different, represent a hydrogen atom or a radical selected from $SO_3M$ and $COCH_3$ and M is sodium, calcium, magnesium or potassium, comprising reacting an alkali metal hydroxide or quaternary ammonium hydroxide with an oligosaccharide of formula:

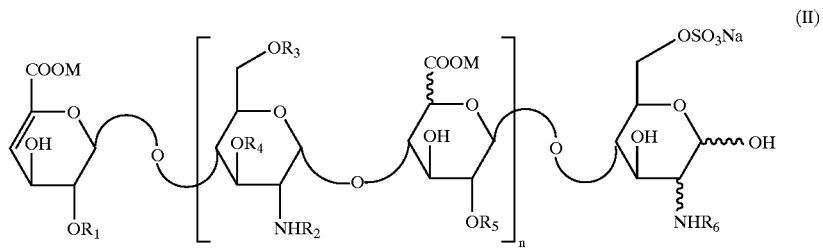

or a mixture thereof, in which n, $R_1$, $R_2$, $R_3$, $R_4$, $R_5$, $R_6$ and M are as defined in formula I.

14. A process according to claim 13, wherein the reaction is carried out in aqueous medium, at a temperature of from 40 to 80° C. and at a pH of from 10 to 13.

15. A process according to claim 13, wherein said reaction is with an aqueous solution of from 1 to 5% alkali metal hydroxide or quaternary ammonium hydroxide.

16. A process according to claim 13, wherein the reaction is carried out at a temperature of from 60 to 70° C.

17. A process according to claim 13, wherein the reaction pH is from 11 to 12.5.

18. A process according to claim 13, wherein the alkali metal hydroxide or quaternary ammonium hydroxide is selected from the group consisting of sodium hydroxide, potassium hydroxide, lithium hydroxide, cesium hydroxide and tetrabutylammonium hydroxide.

19. A process according to claim 13, which further comprises isolating the resulting oligosaccharides of formula (I) or mixtures thereof.

20. A composition comprising one or more purified oligosaccharides of formula:

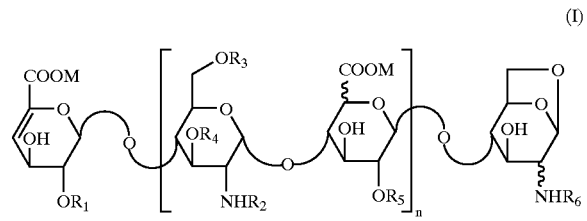

or diastereoisomers thereof, in which n is 0 or is an integer from 1 to 25, $R_1$, $R_3$, $R_4$ and $R_5$, which may be identical or different, represent a hydrogen atom or an $SO_3M$ radical; $R_2$ and $R_6$, which may be identical or different, represent a hydrogen atom or a radical selected from $SO_3M$ and $COCH_3$ and M is sodium, calcium, magnesium or potassium.

21. A composition comprising purified oligosaccharides of formula (I) or diastereoisomers thereof according to claim 20 for which $R_4$ represents a hydrogen atom.

22. A composition comprising purified oligosaccharide of formula (I) or diastereoisomers thereof according to claim 20 for which n is 0 or an integer from 1 to 10.

23. A composition comprising purified oligosaccharide of formula (I) or diastereoisomers thereof according to claim 22 for which n is 0 or an integer from 1 to 6.

24. A composition comprising purified oligosaccharide of formula (I) or diastereoisomers thereof according to claim 20.for which n is an integer from 1 to 6.

25. A composition comprising purified oligosaccharides of formula (I) or diastereoisomers thereof according to claim 20 for which n is 0.

26. A composition comprising purified oligosaccharides of formula (I) or diastereoisomers thereof according to claim 20 for which n is 1.

27. A composition comprising purified oligosaccharides of formula (I) or diastereoisomers thereof according to claim 20 for which n is 2.

28. A method for treating a disease associated with an inflammatory process involving the production of nitric oxide (NO) comprising administering to a patient in need of such treatment a composition according to claim 20.

29. An oligosaccharide of formula:

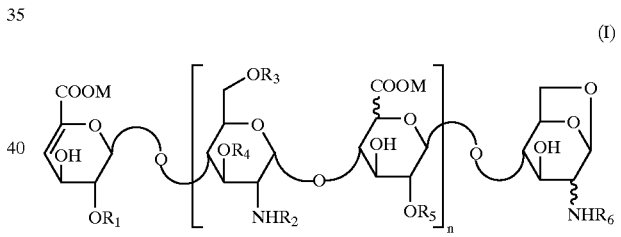

or mixtures thereof, in which n is 0 or is an integer from 1 to 25, $R_1$, $R_3$, $R_4$ and $R_5$, which may be identical or different, represent a hydrogen atom or an $SO_3M$ radical; $R_2$ and $R_6$, which may be identical or different, represent a hydrogen atom or a radical selected from $SO_3M$ and $COCH_3$ and M is sodium, calcium, magnesium or potassium, made by a process comprising reacting an alkali metal hydroxide or quaternary ammonium hydroxide with an oligosaccharide of formula:

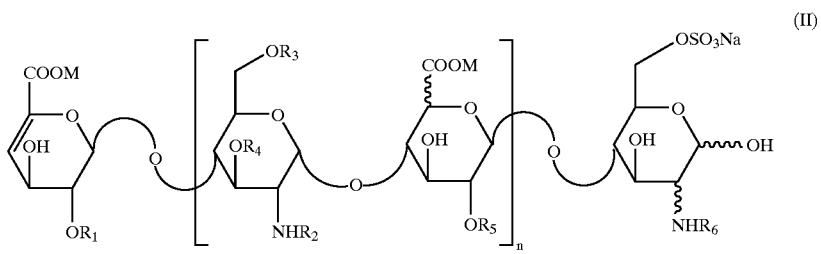

or a mixture thereof, in which n, $R_1$, $R_2$, $R_3$, $R_5$, $R_6$ and M are as defined in formula I.

30. An oligosaccharide of formula:

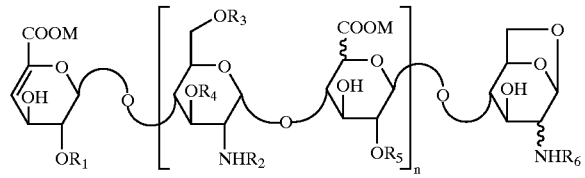
(I)

in which n is 2–25, $R_1$, $R_3$, $R_4$ and $R_5$, which may be identical or different, represent a hydrogen atom or an $SO_3M$ radical; $R_2$ and $R_6$, which may be identical or different, represent a hydrogen atom or a radical selected from $SO_3M$ and $COCH_3$ and M is sodium, calcium, magnesium or potassium.

31. An oligosaccharide of formula (I) according to claim 30 for which n is 2.

32. A pharmaceutical composition containing, as an active ingredient, at least one oligosaccharide according to claim 30.

33. A method for treating a disease associated with an inflammatory process involving the production of nitric oxide (NO) comprising administering to a patient in need of such treatment an oligosaccharide of formula (I) according to claim 30.

34. A composition comprising one or more oligosaccharides of formula:

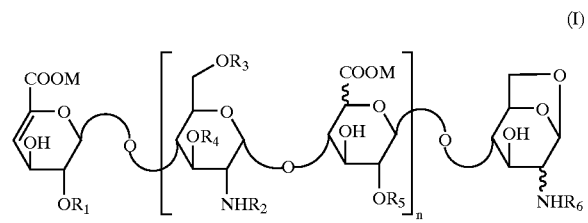
(I)

or diastereoisomers thereof, in which n is 2–25, $R_1$, $R_3$, $R_4$ and $R_5$, which may be identical or different, represent a hydrogen atom or an $SO_3M$ radical; $R_2$ and $R_6$, which may be identical or different, represent a hydrogen atom or a radical selected from $SO_3M$ and $COCH_3$ and M is sodium, calcium, magnesium or potassium.

35. A method for treating a disease associated with an inflammatory process involving the production of nitric oxide (NO) comprising administering to a patient in need of such treatment a composition according to claim 34.

* * * * *